J. T. CASE.
Water-Wheels.
No. 134,731.
Patented Jan. 14, 1873.
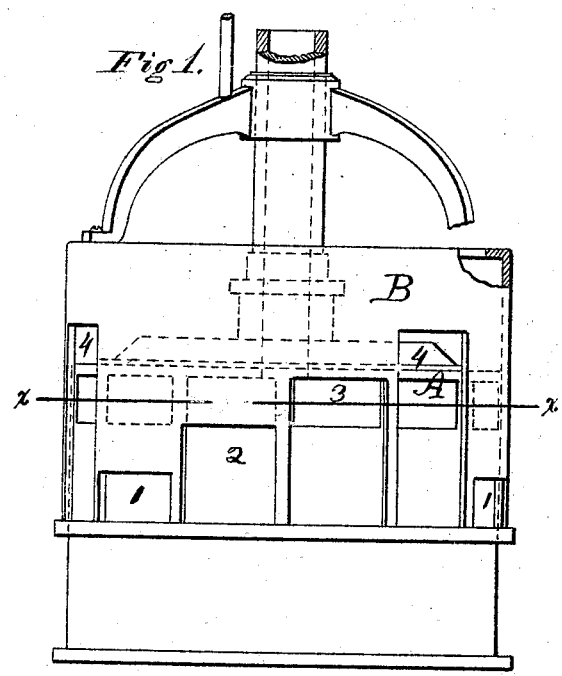
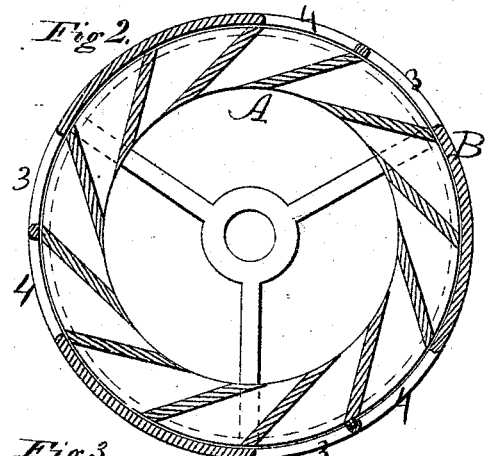
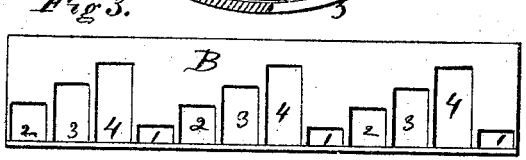
Witnesses:
Harry King
C. A. Shepard
Inventor:
Joel T. Case.
By James Shepard, Atty.

UNITED STATES PATENT OFFICE.

JOEL T. CASE, OF TERRYVILLE, ASSIGNOR TO NATIONAL WATER-WHEEL COMPANY, OF BRISTOL, CONNECTICUT.

IMPROVEMENT IN WATER-WHEELS.

Specification forming part of Letters Patent No. 134,731, dated January 14, 1873.

*To all whom it may concern:*

Be it known that I, JOEL T. CASE, of Terryville, in the county of Litchfield and State of Connecticut, have invented certain Improvements in Water-Wheels, of which the following is a specification:

My invention consists in the employment of a hoop-gate provided with two or more series of graduated openings, in combination with an ordinary chute-case, as hereinafter described.

In the accompanying drawing, Figure 1 is a side elevation of a chute-case and gate which embody my invention; Fig. 2 is a horizontal section of the same on line $x\ x$ of Fig. 1; and Fig. 3 is a plan representing the exterior surface of the gate flattened out.

A represents the chute-case of ordinary construction, the mouth of the chute being all on the same horizontal line. B designates the hoop-gate, which is made to slide up and down over the edge of the chute-case A by means of any proper mechanism. I provide the gate with three series of openings, 1 2 3 4, in which each successive opening is as much deeper than the one below it as is the depth of the chutes.

By raising the gate B until the top of the openings 4 are even with the top of the chute-case A, three chutes upon three sides of the chute-case are opened, the same being equidistant from each other. By raising the gate until the openings 3 are even with the top of the chute-case A, then two chutes upon three sides are open, as shown in Figs. 1 and 2, and so on successively until all are open.

If there are only two sets of openings, which I term graduated openings, the operation and result are the same, except two chutes instead of three will be opened at each elevation of the gate for the distance described.

I claim as my invention—

The series, two or more, of graduated openings 1 2 3 4, formed in the vertically-sliding hoop-gate B, in combination with the ordinary chute-case A, substantially as and for the purpose set forth.

JOEL T. CASE.

Witnesses:
 LEVI SMITH,
 A. L. ATWOOD.